United States Patent [19]
Wirtz

[11] Patent Number: 5,988,840
[45] Date of Patent: Nov. 23, 1999

[54] REPLACEMENT GRILL WITH SLIDING HEADLIGHT COVERS

[76] Inventor: Troy A Wirtz, 912 W. Broadway St., Polk City, Iowa 50226

[21] Appl. No.: 09/183,506

[22] Filed: Oct. 30, 1998

[51] Int. Cl.⁶ ..................................................... B60Q 1/00
[52] U.S. Cl. ........................................... 362/513; 362/496
[58] Field of Search ..................................... 362/512, 513, 362/507, 279, 321, 496

[56] References Cited

U.S. PATENT DOCUMENTS

| | | | |
|---|---|---|---|
| 2,254,137 | 8/1941 | Biehn . | |
| 2,360,499 | 10/1944 | Jackson | 362/512 |
| 4,143,732 | 3/1979 | Schmude et al. | 180/68 |
| 4,310,872 | 1/1982 | Lauve | 362/82 |
| 4,441,144 | 4/1984 | Horiuchi et al. | 362/375 |
| 4,443,836 | 4/1984 | Horiuchi et al. | 362/375 |
| 4,737,893 | 4/1988 | Horansky et al. | 362/64 |
| 4,823,237 | 4/1989 | Horansky et al. | 362/64 |
| 4,951,178 | 8/1990 | Shirai et al. | 362/61 |
| 5,125,714 | 6/1992 | Lecher | 296/180.5 |

*Primary Examiner*—Stephen Husar
*Attorney, Agent, or Firm*—Zarley, McKee, Thomte, Voorhees & Sease

[57] ABSTRACT

A replacement grill having slidable headlight covers is Provided for trucks, sport utility vehicles, and other motor vehicles. The grill includes a frame with a grillwork to allow airflow into the engine compartment. Headlight covers are slidably mounted within the frame for movement between open and closed positions. The movement of the headlight covers is controlled by a motor which is electrically connected to the vehicle headlight switch. Thus, the headlight covers are automatically opened when the headlights are turned on and automatically closed when the headlights are turned off. A chain and sprocket assembly connects the headlight covers to the motor.

16 Claims, 3 Drawing Sheets

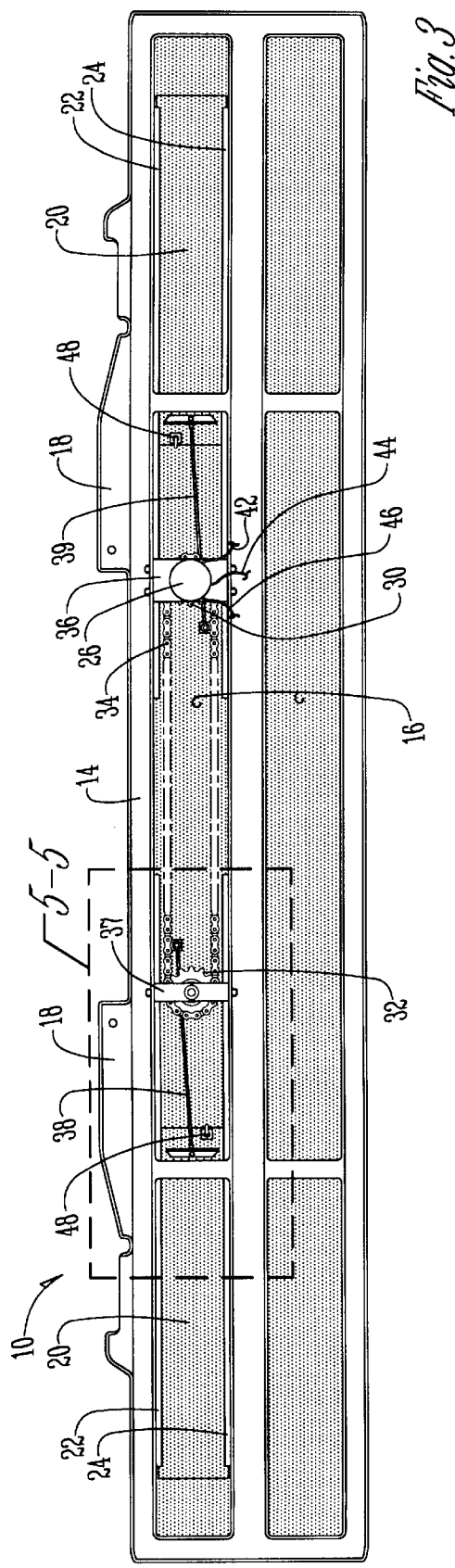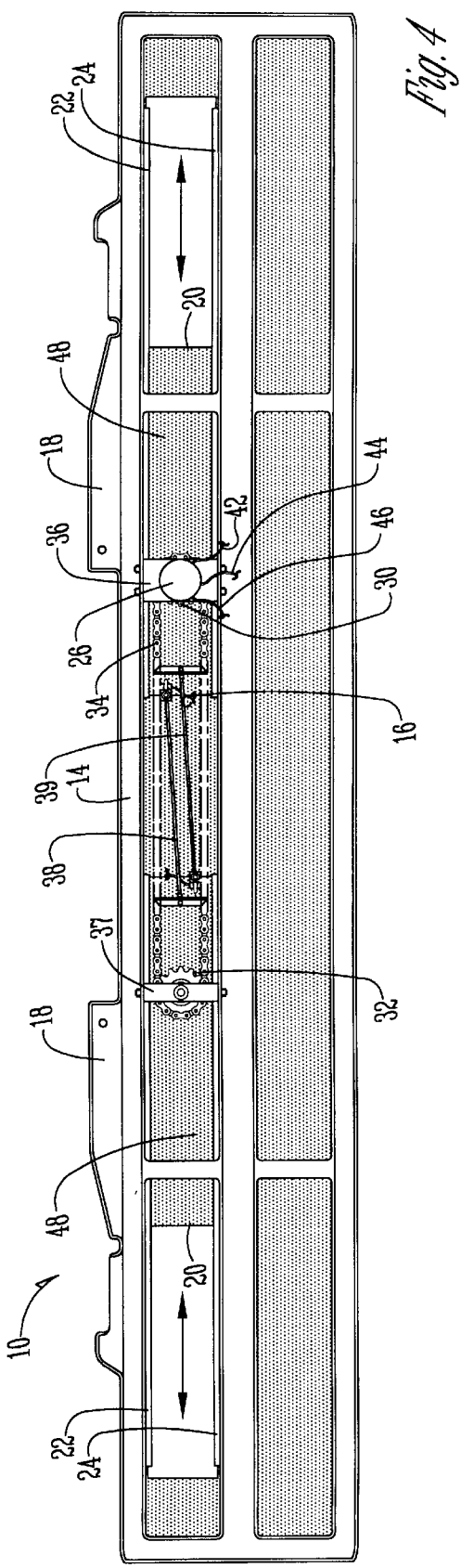

REPLACEMENT GRILL WITH SLIDING HEADLIGHT COVERS

BACKGROUND OF THE INVENTION

Headlight covers are well known in the automotive industry, both as original equipment and as aftermarket add-ons. One type of aftermarket headlight covers snap in place and must be manually removed to expose the headlights for night time driving, which is inconvenient. Another type of conventional headlight covers are pivotally mounted for movement between a closed position covering the headlights and an open position exposing the headlights. Such pivotally moving headlight covers require space above or below the headlights to receive the cover when moved to the open position.

Some headlight covers are combined with the grill of the motor vehicle. However, the structure required in such grills having movable headlight covers is complex and therefore adds to the cost of the unit.

Accordingly, a primary objective of the present invention is the provision of a replacement grill having slidable headlight covers for a motor vehicle.

Another objective of the present invention is the provision of a grill with headlight covers which are automatically moved between open and closed positions when the vehicle headlights are turned on and off.

Another objective of the present invention is the provision of an aftermarket grill with slidable headlight covers which is easy to install, durable in use, economical to manufacture, and having a pleasing appearance.

These and other objectives will become apparent from the following description of the invention.

SUMMARY OF THE INVENTION

The replacement grill of the present invention includes a frame with sliding headlight covers which are movable between open and closed positions relative to the headlights of a motor vehicle. The headlight covers slide laterally as guided by a track on the frame. The movement of the headlight covers is controlled by electrical circuitry which is operatively connected to the vehicle headlight switch such that the headlight covers will automatically move to the open position when the headlights are turned on and automatically move to the closed position when the headlights are turned off. The electrical circuitry includes a reversible motor for driving a chain and sprocket assembly to which the headlight covers are connected. Limit switches deactivate the motor when the covers reach the fully opened and fully closed positions. A grillwork substantially covers the frame to allow air flow into the engine compartment.

BRIEF DESCRIPTION OF THE DRAWINGS

FIG. 3 is a rear elevation view of the replacement grill with slidable headlight covers in the closed position.

FIG. 4 is a rear elevation view similar to FIG. 3 showing the headlight covers in the open position.

DETAILED DESCRIPTION OF THE DRAWINGS

Figure 1:
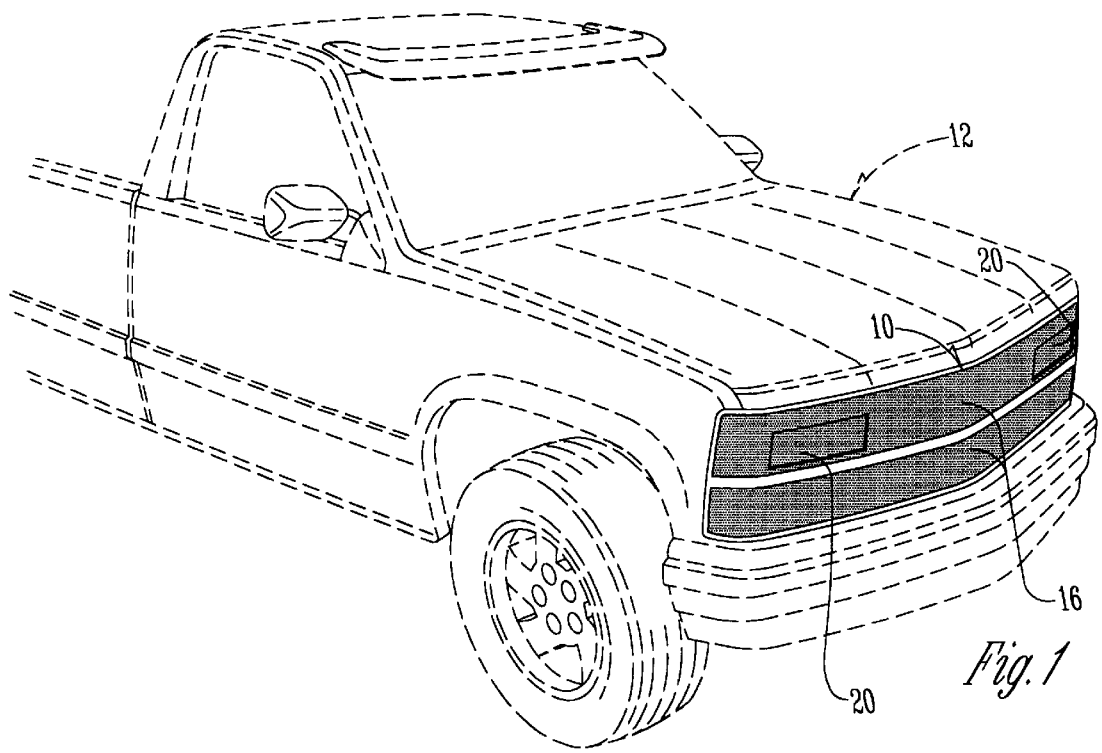
FIG. 1 is a perspective view showing the replacement grill of the present invention mounted on a truck with the headlight covers closed.
Figure 2:
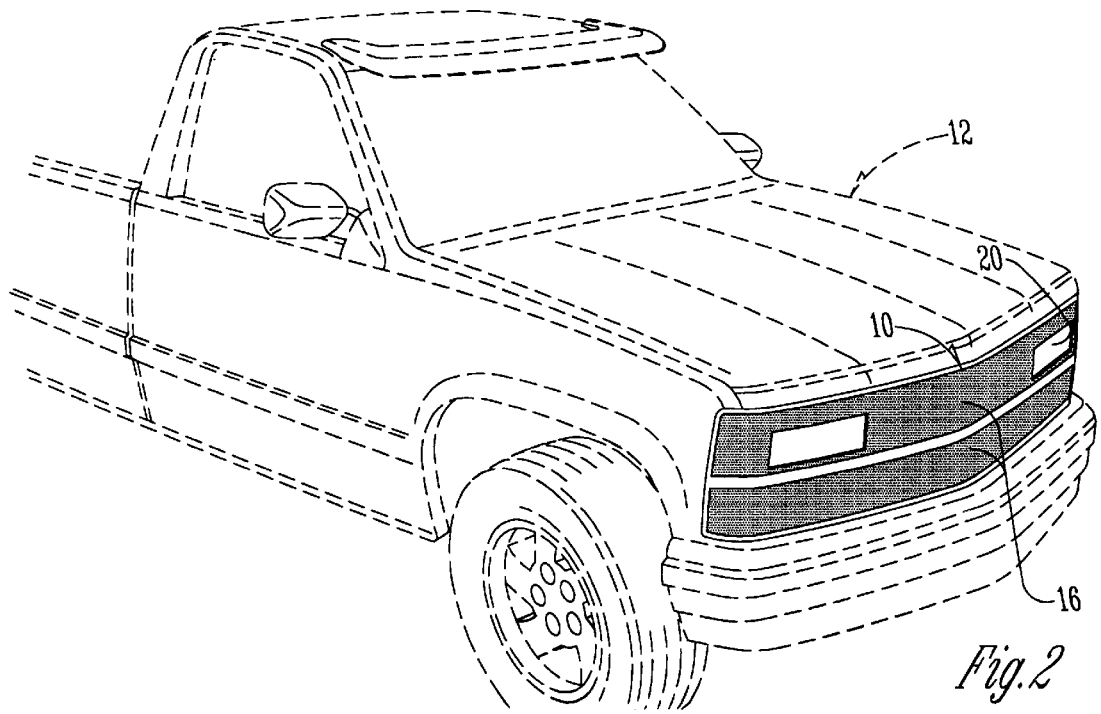
FIG. 2 is a perspective view similar to FIG. 1 showing the headlight covers opened.
Figure 5:
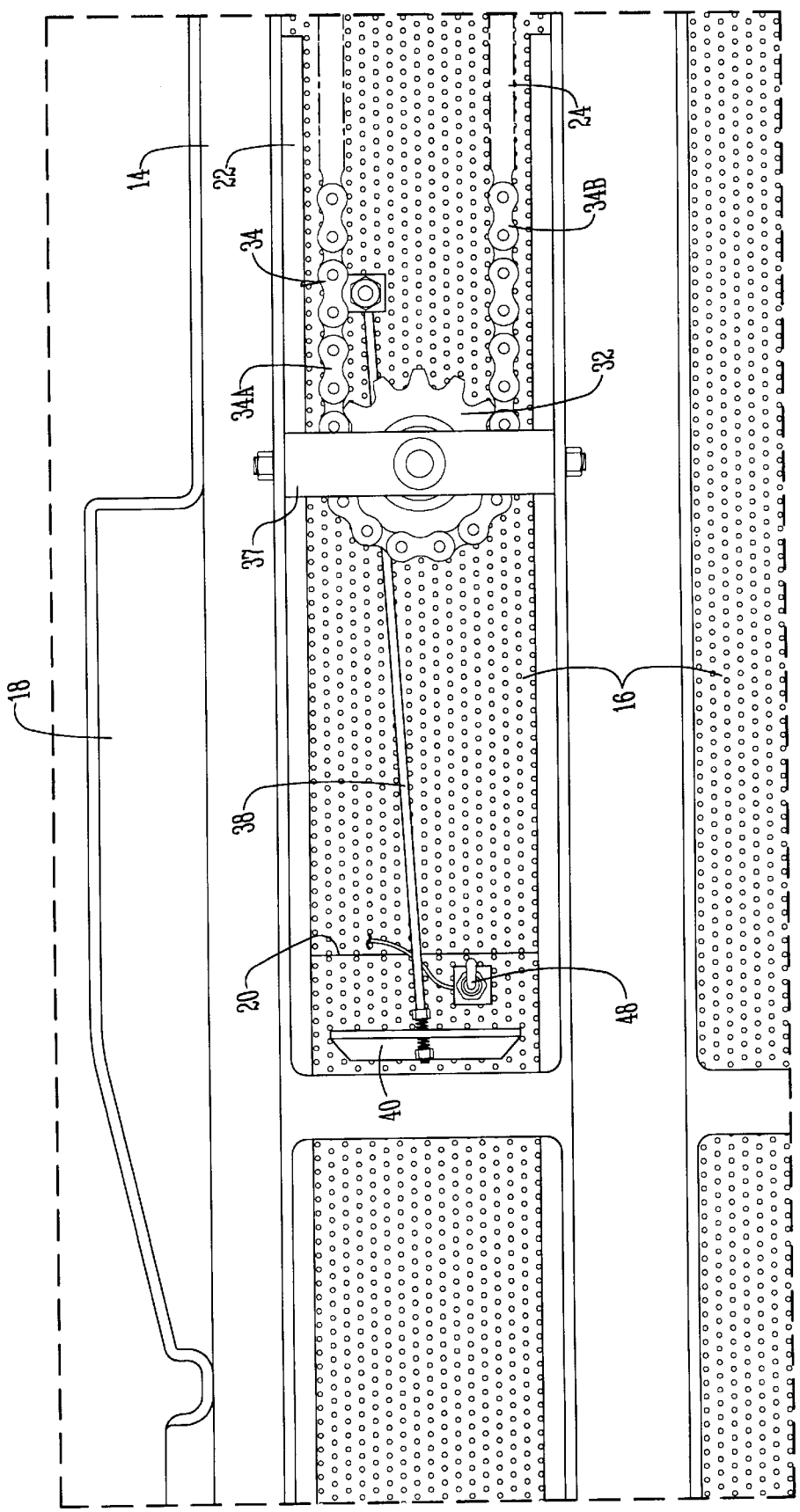
FIG. 5 is an enlarged view taken along line 5—5 of FIG. 3.

The grill with sliding headlight covers of the present invention is generally designated in the drawings by the reference numeral 10. The grill is an aftermarket product adapted to be quickly and easily installed on a motor vehicle, such as a truck 12 or sport utility vehicle.

The grill 10 includes a frame 14 with a grillwork 16 substantially covering the frame 14. As shown in the drawings, the grillwork is perforated to allow airflow into the engine compartment. It is understood that the grillwork may have different designs from that shown in the drawings, such as a grid pattern or louvers to provide airflow therethrough.

As best seen in FIGS. 3 and 4, the frame 14 includes a plurality of tabs 18 with holes which are adapted to align with the installment holes in the vehicle to which the original vehicle grill was attached. Thus, the grill 10 of the present invention utilizes the existing mounting holes in the vehicle 12, thereby providing for quick and easy installment of the replacement grill 10. If the holes in tabs 18 of the frame 14 do not properly align with the existing mounting holes in the vehicle for the grill, holes may be drilled to receive the installation nut and bolt assembly (not shown).

The grill 10 is elongated and includes headlight covers 20 which are slidably mounted on the frame 14. More particularly, the frame 14 includes an upper track 22 and a lower track 24 adjacent the opposite ends of the frame for guiding the sliding movement of the covers 20 between open and closed positions.

The movement of the headlight covers 20 is controlled by an electrical circuit which is operatively connected to the vehicle headlight switch. Thus, when the headlights are turned on, the headlight covers 20 will automatically move to the open position, and when the headlights are turned off, the headlight covers 20 will automatically move to the closed position.

The electrical circuit includes a reversible motor 26. One example of an acceptable motor is Model BYQM 33810-5 sold by Barber Coleman. The motor has a drive shaft on which a drive sprocket 30 is mounted. An idler sprocket 32 is spaced apart from the drive sprocket 30. A chain 34 is trained about the drive sprocket 30 and the idler sprocket 32. A support plate 36 mounted on the frame 14 supports the motor 26 and drive sprocket 30, while a support plate 37 supports the idler sprocket 32. A pair of rods 38, 39 have a first end attached to the chain 34 and a second end attached to a plate or flange 40 of each headlight cover 20. The rods 38, 39 provide the interconnection between the chain 34 and the headlight covers 20. The rods 38, 39 are connected, respectively, to the upper path 34A and lower path 34B of the chain 34, as best seen in FIGS. 3 and 4. Thus, when the motor 26 is actuated to rotate the drive chain and sprocket assembly in a clockwise direction, the headlight covers are retracted laterally towards one another to the open position, thereby exposing the headlights. When the motor 26 is actuated to rotate the chain and sprocket assembly in a counterclockwise direction, the headlight covers 20 are extended laterally to the closed position covering the vehicle headlights.

The wiring for the motor 26 includes a constant power wire 42 connected to the vehicle electrical power source (not shown), a constant ground wire 44 which is grounded, and a headlight wire 46 which is connected to the vehicle headlight switch (not shown). A pair of limit switches 48 are provided to deactivate the motor 26 when the headlight covers 20 reach the fully open and fully closed positions. An example of an acceptable limit switch is a 10 amp mini size micro-switch with a roller spring. The motor 26 is reversible such that rotation of the drive sprocket 30 in one direction opens the headlight covers 20 and rotation of the drive sprocket in the opposite direction closes the headlight covers.

Whereas the invention has been shown and described in connection with the preferred embodiments thereof, it will be understood that many modifications, substitutions, and additions may be made which are within the intended broad scope of the following claims. From the foregoing, it can be seen that the present invention accomplishes at least all of the stated objectives.

What is claimed is:

1. A grill for a motor vehicle having headlights and an electrical system for turning the headlights on and off, comprising:
   a frame adapted to be installed on the motor vehicle;
   headlight covers slidably mounted on the frame for movement between a closed position covering the headlights and an open position uncovering the headlights; and
   a motor operatively connected to the headlight covers for controlling sliding movement between the open and closed positions.

2. The grill of claim 1 further comprising tracks within the frame for guiding the sliding movement of the headlight covers.

3. The grill of claim 2 wherein the tracks extend laterally such that the headlight covers slide laterally between the open and closed positions.

4. The grill of claim 1 further comprising electrical circuitry adapted to be connected to the electric system of the vehicle such that the headlight covers are automatically moved to the open position when the headlights are turned on and automatically moved to the closed position when the headlights are turned off.

5. The grill of claim 4 wherein the electrical circuitry includes at least one limit switch to deactivate the motor when the headlight covers reach the open position.

6. The grill of claim 1 further comprising a grillwork on the frame.

7. The grill of claim 1 further comprising a chain and sprocket assembly driven by the motor, the headlight covers being connected to the chain and sprocket assembly for movement between the open and closed positions.

8. The grill of claim 1 wherein the motor is reversible such that operation in one direction opens the headlight covers and operation in the opposite direction closes the headlight cover.

9. The grill of claim 8 wherein a rod extends from the chain and sprocket assembly to each headlight cover to connect the cover to the assembly.

10. An aftermarket replacement grill for a motor vehicle having headlights, comprising:
    a frame adapted to be mounted on the vehicle;
    headlight covers slidably mounted on the frame for sliding movement between open and closed positions relative to the vehicle headlights; and
    electrical circuitry adapted to electrically connect the headlight covers to the vehicle headlights such that the covers are automatically opened when the headlights are turned on and automatically closed when the headlights are turned off.

11. The grill of claim 10 wherein the electrical circuitry includes a reversible motor operatively connected to the covers for moving the covers between the open and closed positions.

12. The grill of claim 11 wherein the electrical circuitry includes at least one limit switch to deactivate the motor when the covers reach the open and closed positions.

13. The grill of claim 11 further comprising a drive sprocket connected to the motor, a spaced apart idler sprocket, and a chain trained about the sprockets, the covers being connected to the chain such that actuation of the motor rotates the chain about the sprockets so as to move the headlight covers between the open and closed positions.

14. The gear of claim 10 further comprising a track on the frame for each headlight cover to guide the cover movement.

15. The grill of claim 10 wherein the covers move substantially horizontally between the open and closed positions.

16. The grill of claim 10 comprising a grillwork extending substantially over the frame.

* * * * *